July 4, 1950 L. DINESEN 2,513,627
FLOW INDICATOR FOR MILKING MACHINES
Filed Dec. 15, 1947
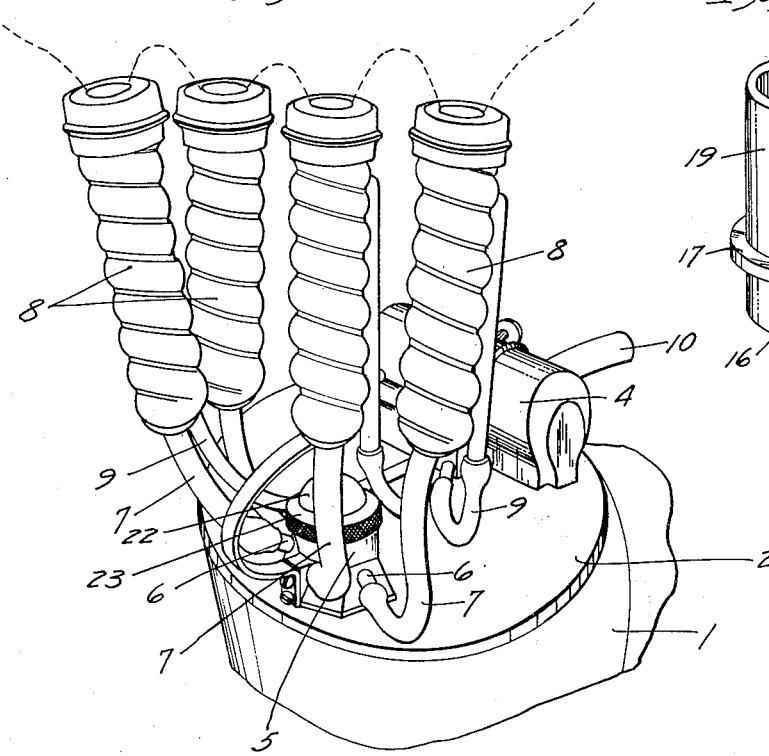
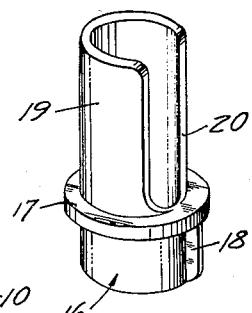
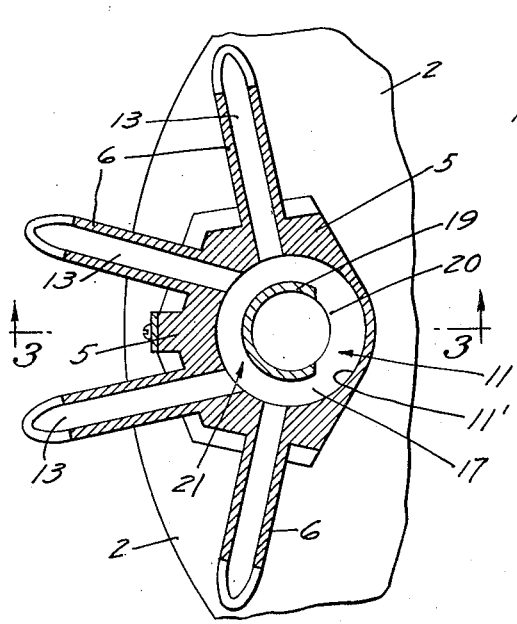
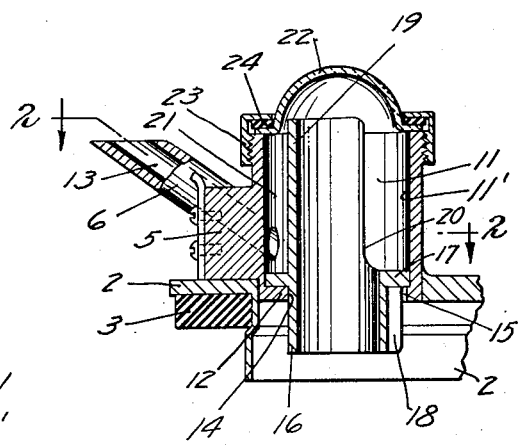
Inventor
Laurits Dinesen
By his Attorneys
Merchant & Merchant Patented July 4, 1950

2,513,627

UNITED STATES PATENT OFFICE 2,513,627

FLOW INDICATOR FOR MILKING MACHINES

Laurits Dinesen, Minneapolis, Minn., assignor to Perfection Manufacturing Corporation, Minneapolis, Minn., a corporation of Minnesota Application December 15, 1947, Serial No. 791,904

2 Claims. (Cl. 31—83)

My invention relates broadly to milking machinery and more specifically to a novel milk flow indicating device therefor.

An important object of my invention is the provision of a milk flow indicating device which is inexpensive to manufacture, foolproof in operation, which is highly sanitary in use and is extremely easy to disassemble and clean.

Another important object of my invention is the provision of a novel combination of milk pail cover and milk flow indicator, which is interposed in the lines leading from the teat cups to the pail.

The above and still further objects and advantages of my invention will become apparent from the following detailed specification, appended claims, and attached drawings.

Referring to the drawings, in which like characters indicate like parts throughout the several views:

Fig. 1 is a fragmentary perspective view showing my novel milk flow indicator applied to the removable cover of a milk pail;

Fig. 2 is a transverse section taken substantially on the line 2—2 of Fig. 1;

Fig. 3 is a vertical section taken substantially on the line 3—3 of Fig. 2; and

Fig. 4 is a view in perspective of the baffle element used in my device.

Referring with greater particularity to the drawings, the numeral 1 indicates a milk pail, preferably of the type to be suspended by a strap or the like underneath the belly of the cow in close proximity to the teats. The pail 1 is provided with a removable cover 2 which is seated thereon, a resilient sealing washer 3 being preferably interposed therebetween. Rigidly secured to the cover 2 is a conventional pulsator 4. Also secured to the cover 2, preferably in spaced relation to the pulsator 4, is a coupling head or claw 5, which is provided with a plurality of radially extending circumferentially spaced nipples 6, to which the milk tubes 7 leading from a plurality of teat cups 8 are adapted to be fastened. As shown, teat cups 8 are also provided with air tubes 9, which lead to the pulsator 4 and thence to a suction pump (not shown) through the suction hose 10.

Within the head 5 is a chamber 11 having a cylindrical side wall 11' and an annular bottom wall 12.

It will be noted that the nipples 6 have passages 13 therein which terminate in circumferentially spaced relationship in the side wall 11' of the chamber 11 above the bottom thereof.

The annular bottom wall 12 provides an opening 14 which is notched as indicated at 15 for purpose which will hereinafter become apparent. A tubular element 16 of a diameter slightly less than that of the opening 14 is provided intermediate its upper and lower ends with a radially projecting circumferentially extending flange 17, which is adapted to rest upon the annular bottom wall 12 of the chamber 11. A radially projecting axially extended key 18 on the tubular element 16, immediately below the flange 17, is adapted to be contained within the notch 15 to prevent rotation of the tubular element 16. The portion of the tubular element 16 which projects above the flange 17, forms an annular baffle 19 which is radially inwardly spaced from the side wall of the chamber 11, and is concentric therewith.

A segmental slot 20 extends from the top of the baffle 19 downwardly to the flange 17 and provides an opening from the chamber 11 to the interior of the milk pail. It will be observed, particularly by reference to Figs. 2 and 3, that the opening or slot 20 in the baffle 19 is circumferentially spaced from the inlet passages 13. Thus the baffle 19 and the wall 11' of the chamber 11 define a segmental deflecting channel 21.

Overlying the baffle 19 and closing the upper end of chamber 11 is a transparent top 22, preferably dome-like in shape, which is spaced from the upper end of baffle 19 and is secured to the head 5 by means of an annular screw-threaded clamping element 23. A sealing washer 24 between the top 22 and the clamping element 23 provides an air-tight seal at the upper end of the chamber 11.

From the above it should be obvious that milk from the teat cups 8, entering the chamber 11 through the inlet passages 13 of the nipples 6, will be impinged upon the sides of the deflecting baffle 19 with sufficient force to cause at least a portion of the milk to be deflected upwardly against the transparent dome-like top 22, thus making it possible for the operator to detect the flow at all times. It will be noted that the bulk of the milk entering the chamber 11 will flow around the baffle 19 and through the slot 20 into the milk pail 1. Furthermore, in view of the fact that the slot 20 extends completely to the base of the flange 19, all milk within the chamber 11 will be drained off into the pail 1, under the action of gravity, when the machine is stopped. This is an important factor for sanitation.

When, however, it becomes necessary to wash or rinse the milking apparatus, the milk flow indicator may be quickly cleaned by simply unscrewing the clamping ring 23 and lifting the tubular element 16 from the chamber 11.

My novel device has been commercially tried and found to be completely satisfactory for the accomplishment of the above objects, and while I have disclosed a commercial form of my invention, it should be obvious that the same is capable of modification without departure from the scope and spirit of the appended claims.

What I claim is:

1. A milk flow indicator adapted to be inserted into the milk lines leading from a plurality of teat cups, said indicator comprising a coupling head, said head being provided with a vertically-extended bore which terminates short of the bottom wall of said head, said bore and said bottom wall providing a cylindrical chamber, said bottom wall being provided with a reduced concentric discharge opening, a plurality of circumferentially-spaced nipples projecting radially of the outside of said head and each communicating with said chamber, a tubular baffle having a radially-projecting circumferentially-extended flange adjacent its base adapted to rest upon the bottom wall of said head within said chamber, said baffle being concentric with the side wall of said chamber and being spaced inwardly therefrom to provide a milk-deflecting chamber, said baffle being provided with an axially-extended slot which extends from the upper end thereof to said flange, means preventing rotation of said baffle with respect to said head, and a removable transparent top in the upper portion of said head positioned over and in spaced relation to the deflecting baffle.

2. The structure defined in claim 1 in which the means for preventing rotation of said baffle within said chamber comprises a radially-projected key which extends from said flange to the base of said baffle, the bottom wall of said coupling head being provided with a notch adapted to receive said key.

LAURITS DINESEN.

REFERENCES CITED

The following references are of record in the file of this patent:

UNITED STATES PATENTS

| Number | Name | Date |
|---|---|---|
| 975,127 | Fuller | Nov. 8, 1910 |
| 1,367,630 | Skelly | Feb. 8, 1921 |
| 1,919,172 | Schmitt | July 18, 1933 |
| 2,329,396 | Dinesen | Sept. 14, 1943 |
| 2,345,819 | Kirk et al. | Apr. 4, 1944 |
| 2,376,717 | Omdalen | May 22, 1945 |